Figure 1:
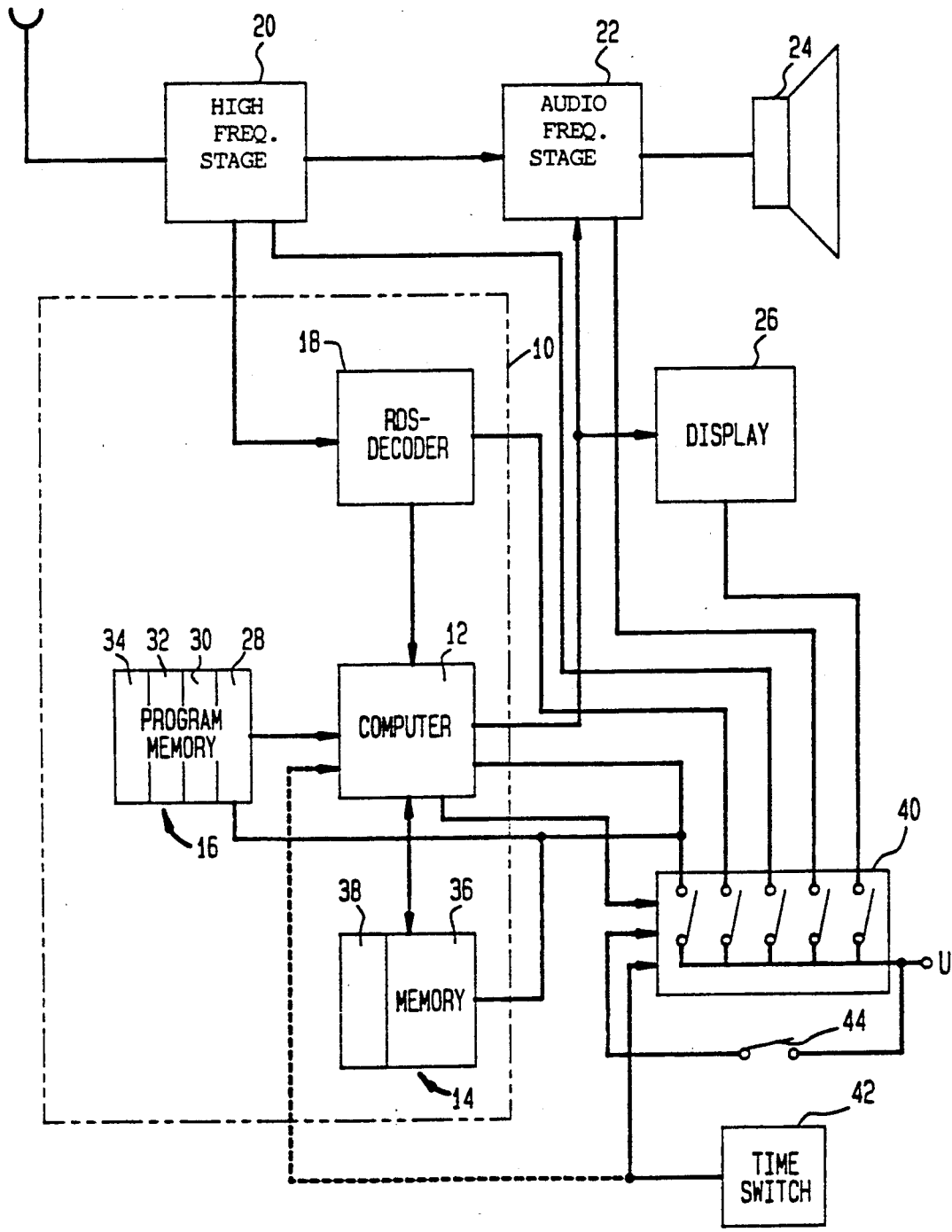

United States Patent [19]
Duckeck

[11] Patent Number: 5,101,510
[45] Date of Patent: Mar. 31, 1992

[54] ENERGY CONSERVING STAND-BY FUNCTION IN RADIO TRAFFIC REPORT RECEIVER

[75] Inventor: Ralf Duckeck, Hildesheim, Fed. Rep. of Germany

[73] Assignee: Robert Bosch GmbH, Stuttgart, Fed. Rep. of Germany

[21] Appl. No.: 447,378

[22] Filed: Dec. 7, 1989

[51] Int. Cl.$^5$ .............................................. H04B 1/16
[52] U.S. Cl. .................................... 455/186; 455/343; 455/345
[58] Field of Search ................. 455/67, 343, 186, 226, 455/345, 228, 127; 370/60, 94.1; 371/37.1, 57.1, 57.2; 364/436; 343/200; 340/905

[56] References Cited

U.S. PATENT DOCUMENTS

| | | | |
|---|---|---|---|
| 3,949,401 | 4/1976 | Hegeler | 343/200 |
| 4,380,821 | 4/1983 | Eckhardt . | |
| 4,435,843 | 3/1984 | Eilers et al. . | |
| 4,450,589 | 5/1984 | Eilers et al. . | |
| 4,499,603 | 2/1985 | Eilers . | |
| 4,802,240 | 1/1989 | Yamaguchi et al. | 455/343 |
| 4,862,513 | 8/1989 | Bragas . | |
| 4,903,269 | 2/1990 | Fedele | 371/57.2 |
| 4,903,335 | 2/1990 | Shimizu | 455/343 |

FOREIGN PATENT DOCUMENTS

| | | |
|---|---|---|
| 3536820 | 4/1987 | Fed. Rep. of Germany . |
| 3633881 | 4/1988 | Fed. Rep. of Germany . |
| 2554618 | 5/1985 | France . |
| 2050767 | 1/1981 | United Kingdom . |

Primary Examiner—Curtis Kuntz
Attorney, Agent, or Firm—Frishauf, Holtz, Goodman & Woodward

[57] ABSTRACT

A radio receiver, particularly a vehicle receiver, is equipped with a decoder for decoding traffic announcements received in digitally encoded form. It includes a memory in which the traffic announcements are stored, ready to be called up. If the radio receiver is to be capable of displaying current traffic announcements at all times, it must be kept on continuously so that it can copy any updated traffic announcements into its memory. In a vehicle receiver, however, the result is a high energy requirement that excessively burdens the vehicle battery. The radio receiver according to the invention is equipped with an energy conserving circuit, which connects only those components needed for evaluating the traffic announcements to the operating voltage source. It can moreover be provided that the greatest energy consumers of these components are switched on only intermittently, and that the complete cycles of traffic announcements are evaluated only whenever the prior evaluation of an updating bit has indicated that changes have been made.

6 Claims, 3 Drawing Sheets

ENERGY CONSERVING STAND-BY FUNCTION IN RADIO TRAFFIC REPORT RECEIVER

Cross-reference to related U.S. patent and applications, the disclosures of which are hereby incorporated by reference:

U.S. Pat. No. 3,949,401, HEGELER; U.S. Pat Nos. 4,435,843 and 4,450,589, EILERS & BRAGAS
U.S. Pat. No. 4,499,603, EILERS;
Ser. No. 07,447,578, BRAGAS & DUCKECK, filed Dec. 7, 1989 (based on German P 38 20 640.4 of June 18, 1988);
Ser. No. 07,447,165, DUCKECK, filed Dec. 7, 1989 (based on German P 38 20 641.2 of June 18, 1988).

FIELD OF THE INVENTION

The invention relates to a radio receiver, in particular a vehicle receiver, having a decoder for decoding traffic announcements received in digitally encoded form. As a rule, traffic announcements that are transmitted in the clear in the form of tone modulation after interruption of the ongoing program are tied to fixed times, or are interspersed into the program if the traffic obstructions are particularly acute. With this system, the driver cannot as a rule count on receiving information on the traffic situation immediately when he starts a trip.

With the introduction of the RDS (Radio Data System), it becomes possible to transmit not only the tone modulation of an FM radio program but also data. It is attractive to transmit not only information on the stations received but also the content of the program and traffic announcements. Since these traffic announcements are broadcast in modulated form as digital signals on an auxiliary carrier, they can be broadcast continuously without interrupting the tone modulation of the FM radio program. The driver is thus informed on the current traffic situation soon after he switches on his radio.

Upon starting a trip, however, it may be advantageous to gain an overview of the traffic situation at once, before deciding which route to take. If one transmission cycle of traffic announcements has just begun when the radio is switched on, then the driver has to wait through that and following announcements before obtaining the information he desires, via his display or loudspeaker.

To avoid this disadvantage, the driver may simply leave his radio on, whenever he leaves the vehicle so that on returning to the vehicle he then receives the current traffic information immediately. However, this is impractical when the vehicle is parked for relatively long periods, such as a day or more, because electrical energy is unnecessarily drawn from the vehicle battery, and the remaining energy may not be sufficient to start the engine.

The object of the invention is to improve a radio receiver such that the display of current traffic announcements is made possible immediately after the radio is switched on, while requiring substantially less energy.

By means of the energy conserving circuit, components not needed for processing the data packet to evaluate the traffic announcements are disconnected from the operating voltage source. The other components continue to operate, so that the reservoir for storing the traffic announcements in memory is supplied with current information.

A further feature provides that the energy conserving circuit is assigned a time switch, by means of which at least the components requiring the most energy for reception, decoding, evaluation and memorizing of the traffic announcements, and preferably the high frequency part, are connected to the operating voltage source only at predetermined times or after predetermined time intervals.

By means of this provision, the energy consumption can be reduced still further if among the remaining components, the ones that have the greatest requirement, such as the high frequency part, are operated with an ON rate of only between 5 and 20%. In that case, although some of the traffic announcements that are present in the memory and are displayed when the radio receiver is on might possibly be out of date, this situation occurs relatively seldom, because as a rule the traffic announcements are broadcast unchanged for several cycles before any change takes place.

If the time intervals are dimensioned approximately such that they correspond to an average broadcast cycle for traffic announcements, then when the traffic announcements located in the memory are updated, a possible delay of 1 to 2 cycles in the updating occurs. This situation is entirely acceptable in terms of the further energy conserving potential attained in this way.

Further features of the invention will become apparent from the claims, description and drawing, which shows an exemplary embodiment.

Figure 2:
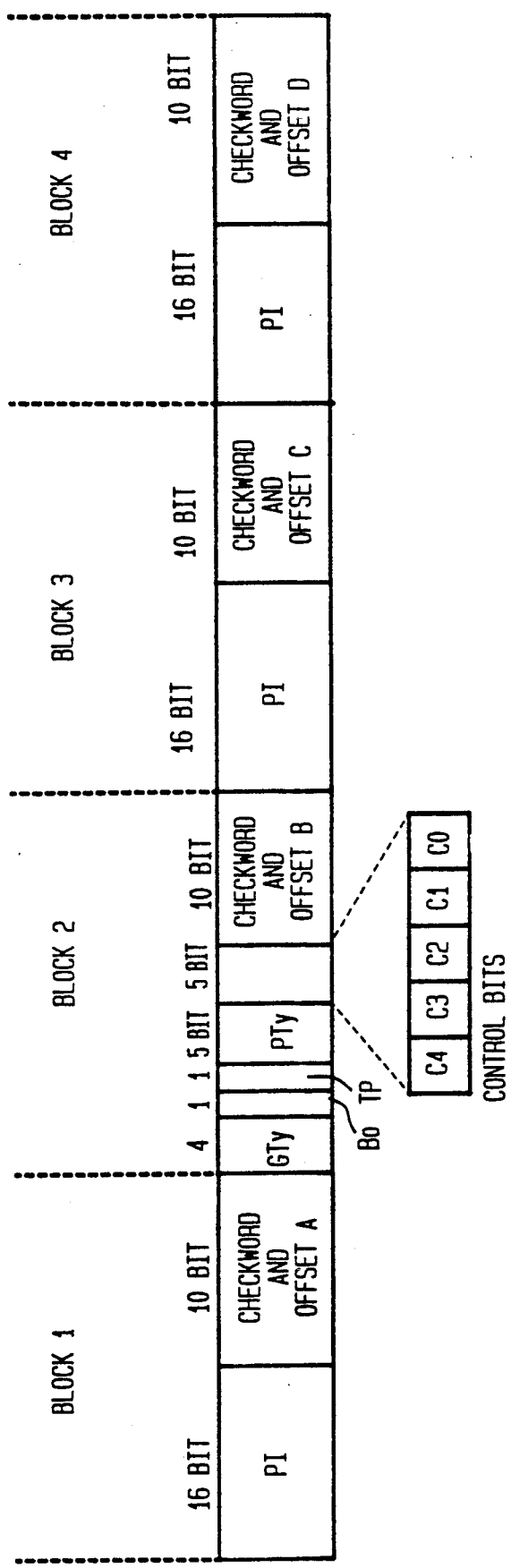

Shown in the drawing are:

FIG. 1, a block circuit diagram of a radio receiver in accordance with the invention;

FIG. 2, a graphic illustration of an excerpt from the RDS packet; and

Figure 3:
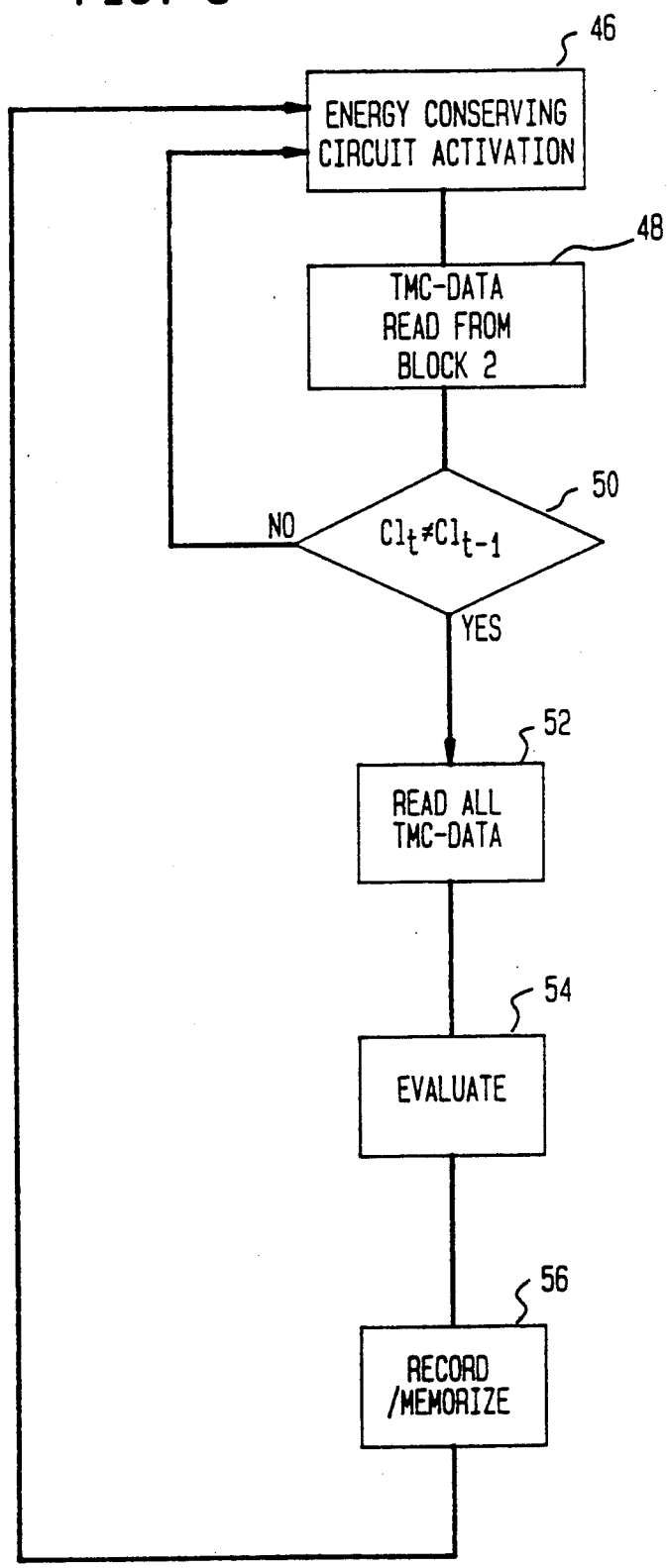

FIG. 3, a flow chart of a program course as stored in memory in the form of a control program in the program memory of the computer.

The block circuit diagram of a radio receiver shown in FIG. 1 includes a high frequency (HF) part 20, an audio frequency (AF) part 22, a loudspeaker 24, a decoder 10, a display device 26, an energy conserving circuit 40, a time switch 42, and a main switch 44.

Signals coming in via the antenna are demodulated in the high frequency part 20, while the tone modulation is delivered to the low frequency part 22 and reproduced via the loudspeaker 24. The auxiliary carrier that is also broadcast and is demodulated in the high frequency part 20 is delivered to an RDS decoder 18 present in the decoder 10; the decoder 18 decodes the data packet. Within the data packet, a part including traffic announcements is designated as a TMC (traffic message channel).

This channel is evaluated by the computer 12, which is controlled by a control program stored in memory locations 28 of the program memory 16. The traffic announcements evaluated reach memory locations 14 of a memory 36. From the decoded data words, the computer 12 can form standardized traffic announcements, which are delivered to the low frequency part 22 and to the display device 26 and are reproduced via the loudspeaker 24 in the form of synthetic speed and/or alphanumerically via the display device 26.

Other memory locations 30, 32 and 34 in which further control programs are stored are also located in the program memory 16. These programs can control the computer 12 alternatively or in addition. In addition to the memory locations for the contents of the traffic announcements, the memory 14 additionally includes a memory location 38, in which an updating bit present in the data packet is stored in accordance with its evaluation.

An energy conserving circuit 40 is also provided, the input terminal of which is connected to a voltage source U and the output terminals of which are connected to the voltage supply inputs of the components of the radio receiver. The energy conserving circuit 40 has a plurality of control inputs, by way of which various switches that can connect the various components to the operating voltage source or disconnect them from it can be controlled.

These inputs are a first control input, which is connected to the operating voltage source U via a main switch 44; a second control input, which is connected to the computer 12; and a third control input, which is connected to a time switch 42. The time switch 42 is connected to the computer 12 either additionally or alternatively, as represented by a dashed connecting line.

Depending on requirements for energy saving potential, the energy conserving circuit 40 may be provided with one or more separately controllable switches for controlling the electrical circuits connected to it. In the simplest case, one switch suffices, which upon actuation of the main switch 44 of the radio receiver for instance disconnects the low frequency part 22 and the display 26 from the operating voltage source U, while the other components continue to be connected to that operating voltage source U.

In a further expansion stage, a switch that additionally turns the high frequency part 20 on or off may be provided. This switch is suitably controlled by the time switch 42; the high frequency part 20 is put into operation for only a short period of time on each occasion, so that it can receive a station that is also broadcasting a data packet and can then be put back out of operation.

Since the high frequency part of expensive radio receivers has a current consumption of 150 to 200 mA, given an operating voltage of 12 V, considerable energy savings are attainable by reducing the ON rate, for instance to approximately 20%, and for use in a vehicle, the duration of starting readiness on the part of the battery can be lengthened by a factor of 5, in comparison to a high frequency part that is left on continuously.

Still greater energy savings are possible if, after the evaluation of one complete cycle of traffic announcements, a check is first made as to whether the traffic announcements have changed or not. This can be done by using the time switch 42 to call up a control program, for instance stored in memory locations 28 of the program memory 16.

By means of this control program, the computer 12 is controlled in such a way that after the first complete cycle of traffic announcements, an updating bit that is present in the data packet and is changed each time the traffic announcements change is identified each time the control program is called up again. This bit is evaluated and stored in memory and compared with the preceding updating bit. Only if the updating bit has changed is at least one further complete cycle of traffic announcements then decoded, and the memory contents rewritten with these changed traffic announcements.

Otherwise, by a second control program located on the memory locations 30 of the program memory 16, the computer 12 makes the energy conserving circuit 40 directly disconnect the greatest energy consumers among the components needed for processing the traffic announcements from the operating voltage source U.

For explanation of the data packet decoded by the RDS decoder 18, see FIG. 2. There, four blocks each for one RDS group are shown schematically. Each block includes 26 bits, the first 16 bits of which contain data and the last 10 bits of which contain a checkword for error recognition and an offset as a synchronizing word.

Of the first 16 bits for data words present in block 2, the first four bits are reserved as a group code GTy; the next bit B0 is reserved as an offset code; the next bit is reserved as an ARI identification bit TP; and the next five bits are reserved as a program type PTy. Up to the last 10 bits of this block 2, accordingly there are still five control bits $C_4$, $C_3$, $C_2$, $C_1$ and $C_0$ left over. One of these control bits can be used as an updating bit; preferably, this is bit $C_1$.

In block 3, once again a program identification is transmitted, and block 4 contains data words that indicate either the number or content of the traffic announcements. The decision as to whether the number or content of traffic announcements is transmitted depends on the bit Bo in block 2. If its state is 1, then the offset bit in block C becomes C'. This means that the number of the traffic announcements is transmitted in block 4.

Contrarily, if the offset bit Bo in block 2 has the value of zero, then the offset bit in block 3 changes to C. This means that the content of traffic announcements is transmitted in block 4.

The criterion of how high the number of traffic announcements is, which can be derived from the data packet of the RDS group, makes it possible to define the end of one cycle and for the computer 12, after the transmission of one complete cycle, to cause the current conserving circuit 40 to disconnect the applicable components from the operating voltage source U.

FIG. 3 is a flow chart of the control programs stored in memory locations 28 and 30 of the program memory 16, which programs are combined into one in the flow chart. The flow chart begins at 46 with a method step in which the energy conserving circuit 40 has disconnected the components having the greatest energy requirement from the operating voltage source U. In the next method step, 40, the data that are relevant to traffic announcements are read in block 2.

In this method step, the updating bit $C_1$ and the offset code B0 are identified. In the next method step, 50, the updating bit $C1_t$ that has been read is compared with the previously memorized updating bit $C1_{t-1}$. If the comparison shows inequality, then all the data pertaining to traffic announcements are read in method step 52. The data read are then evaluated in a method step 54 and stored in memory in a method step 56.

After the storage in memory, a return to method step 46 takes place. In the simplest cast, the components that require a great deal of energy are disconnected from the operating voltage source only during method step 46. In the other method steps 48–56, contrarily, except for the low frequency part 22 and the display 26, they are connected to the operating voltage source U.

Once traffic announcements have been stored in memory during the first run through the program, it should be assumed that in the next run that the same cycle of traffic announcements will be broadcast. Once the data containing traffic announcements have been read out of block 2 in method step 48, the comparison performed in method step 50 between the current updating bit $C1_t$ and the updating bit $C1_{t-1}$ stored in memory before it leads to the result that there is not an inequality; that is, the decision is NO. In that case, a return is again made to the method step 46, and the time-consuming method steps 52–56 are dispensed with.

Since the updating bit includes only one bit, while a plurality of RDS groups may be needed to broadcast the traffic announcements after transmission of their number and content, it can be appreciated that by the provision included in the program course described, a further considerable reduction in the ON rate of the components having a high energy requirement can be attained.

Since under difficult broadcasting conditions the data packet will contain errors, it may be necessary to use error-correction provisions in order to obtain satisfactory traffic announcements. In that case, a third control program provides that after method step 54, for instance, a return is made to method step 52, for decoding and evaluating further complete cycles of traffic announcements, until error-free traffic announcements have been obtained. After that, a transition is made to method step 56, and the remaining course is as described above in conjunction with FIG. 3.

One option, in which unlike the above-mentioned method the high frequency part 20 and the RDS decoder 18 need be turned on during only one cycle, is provided by a fourth control program. Here, once one complete cycle of traffic announcements has been read, the energy conserving circuit is made to disconnect the greatest energy consumers, in other words the high frequency part 20 and optionally the components 18 required for decoding, from the operating voltage source U. Next, the data that have been read are subjected to error-correction provisions, until in a favorable case satisfactory traffic announcements are obtained, which are then stored in memory in method step 56.

Upon the return to method step 46, still other components can optionally be switched off as well, to still further reduce the energy consumption, until the method course described is started again with method step 48, by means of the time switch.

If the time switch 42 is dimensioned in such a way that the components required for receiving the traffic announcements are switched on approximately once a minute, then with an expected ON time of approximately 5 seconds under unfavorable reception conditions, a reduction of the energy consumption to less than 10% is obtained. If the radio receiver is used in a vehicle, this maintains the starting reserve of the vehicle battery, which is thus protected against major discharges, and which also lengthens the service life of the individual electronic components.

I claim:

1. A radio receiver adapted to simultaneously receive
   a voice channel and
   a digital data channel, having
   a source of operating voltage (U) and the following components:
   a high-frequency stage with a plurality of outputs;
   an audio-frequency stage connected to one of said outputs;
   a decoder, connected to another of said outputs, for decoding traffic announcements received in digitally encoded form via said digital data channel;
   a computer, connected to an output of said decoder, for evaluating a data packet received from said decoder;
   a memory, bidirectionally connected to said computer, for temporarily storing said traffic announcements;
   switch means, having
      a power input connected to said operating voltage source,
      a control input connected to said computer, and
      respective power supply outputs connected to each of the foregoing components, for conserving electrical energy by selectively energizing only those components needed for traffic announcement monitoring purposes, namely said high-frequency stage, said decoder, said computer, and said memory;
   timing means, having an output connected to at least one of said computer and said switch means, for further conserving electrical energy by discontinuously energizing said high-frequency stages;
   and means for detecting when one complete cycle of traffic announcements has been decoded for the first time and written into the memory, for periodically identifying, evaluating, and storing in memory an updating bit which is present in the data packet and is changed each time the traffic announcements change and for responding to a change in said updating bit by storing in said memory at least one further complete cycle of traffic announcements.

2. The radio receiver of claim 1,
   further comprising a program memory having an output connected to said computer, and containing a control program, by means of which program, when the updating bit has not changed, the energy conserving switch means is made to directly disconnect, from the operating voltage source, the greatest energy consumers among the components required for reception, decoding, evaluation and data storage.

3. The radio receiver of claim 1,
   further comprising a program memory having an output connected to said computer, and containing a control program, by means of which program, when the updating bit has changed, further complete cycles of traffic announcements are decoded and evaluated until such time as error-free traffic announcements are obtained, the memory contents are then rewritten with these changed traffic announcements, next, the energy conserving switch means is made to directly disconnect, from the operating voltage source, the greatest energy consumers among the components required for reception, decoding, evaluation and data storage.

4. The radio receiver of claim 1,
   further comprising a program memory having an output connected to said computer, and containing a control program, by means of which program, when the updating bit has changed, one complete cycle of traffic announcements is decoded and read, next, the energy conserving circuit (40) is made to disconnect the greatest energy consumers among the components required for reception (20) and decoding (18) from the operating voltage source, the traffic announcements are then evaluated, the memory contents are rewritten with these changed traffic announcements; and, finally, the energy conserving switch means is made to directly disconnect, from the operating voltage source, the greatest energy consumers among the components required for reception, decoding, evaluation and data storage.

5. The radio receiver of claim 1, wherein said means for identifying an updating bit comprises means for evaluating a control bit, present in block 2 of a data packet generated in accordance with the European Broadcasting Union's Radio Data System (RDS) specification for Traffic Message Channel (TMC) broadcasts.

6. The radio receiver of claim 1, characterized in that the timing means is set for a time interval of approximately one minute.

* * * * *